United States Patent
Gareau et al.

(10) Patent No.: US 8,971,609 B2
(45) Date of Patent: Mar. 3, 2015

(54) AUTOMATED DETECTION OF MELANOMA

(75) Inventors: Dan S. Gareau, Portland, OR (US);
Ricky Hennessy, West Linn, OR (US);
Steve Jacques, Portland, OR (US)

(73) Assignee: Oregon Health & Science University,
Portland, OR (US)

(*) Notice: Subject to any disclaimer, the term of this patent is extended or adjusted under 35 U.S.C. 154(b) by 69 days.

(21) Appl. No.: 13/394,999

(22) PCT Filed: Sep. 9, 2010

(86) PCT No.: PCT/US2010/048296
§ 371 (c)(1),
(2), (4) Date: Mar. 8, 2012

(87) PCT Pub. No.: WO2011/031879
PCT Pub. Date: Mar. 17, 2011

(65) Prior Publication Data
US 2012/0170828 A1  Jul. 5, 2012

Related U.S. Application Data

(60) Provisional application No. 61/240,703, filed on Sep. 9, 2009.

(51) Int. Cl.
*G06K 9/00* (2006.01)
*G06T 7/00* (2006.01)

(52) U.S. Cl.
CPC .......... *G06T 7/0057* (2013.01); *G06K 9/00147* (2013.01); *G06T 7/004* (2013.01); *G06T 2207/10056* (2013.01); *G06T 2207/30088* (2013.01); *G06T 2207/30096* (2013.01)
USPC ........................................ 382/133

(58) Field of Classification Search
None
See application file for complete search history.

(56) References Cited

U.S. PATENT DOCUMENTS 7,054,674 B2 * 5/2006 Cane et al. ............ 600/407
(Continued)

FOREIGN PATENT DOCUMENTS

WO  2007-020643 A2   2/2007
WO  2007-144817 A1   12/2007

OTHER PUBLICATIONS

Gareau DS, et al., "Noninvasive Imaging of Melanoma with Reflectance Mode Confocal Scanning Laser Microscopy in a Murine Model," Journal of Investigative Dermatology, 2007, vol. 127, pp. 2184-2190.
(Continued)

*Primary Examiner* — Nancy Bitar
(74) *Attorney, Agent, or Firm* — Schwabe, Williamson & Wyatt

(57) ABSTRACT

Embodiments herein exploit the optical sectioning capability of reflectance confocal microscopy to non-invasively survey the dermal-epidermal junction (DEJ), noting the irregularities associated with malignancy. Methods are provided to aid a clinician in diagnosing melanoma through pattern recognition to extract pertinent diagnostic information from large 3D confocal images. Identifying the combination of pagetoid melanocytes and DEJ breakdown increases the accuracy of detection. A method may be used to process a 3D confocal volume of images taken by a clinician of a suspicious lesion and deduce the depth location z of the first reflective surface (FRS) at each x-y position. This FRS is where the most superficial melanin resides. In this manner, the stratum corneum and epidermis are digitally stripped and no longer distract the clinician from the more diagnostically relevant pigmented cell network. The FRS is putatively either the DEJ for benign nevi or the depth of a pagetoid melanocyte at x,y above the DEJ. Thus by creating a 3D surface plot of the FRS for each lateral x,y point, the presence of pagetoid cells is identified by a discreet jump in the FRS above the level of the DEJ. The DEJ map may also be used to determine if breakdown of the DEJ is occurring.

15 Claims, 4 Drawing Sheets

(56) References Cited

U.S. PATENT DOCUMENTS

| | | | |
|---|---|---|---|
| 7,922,709 B2* | 4/2011 | Zhang et al. | 604/501 |
| 8,109,924 B2* | 2/2012 | Altshuler et al. | 606/9 |
| 8,523,926 B2* | 9/2013 | Neev | 607/89 |
| 2005/0036667 A1* | 2/2005 | So et al. | 382/128 |
| 2005/0288573 A1* | 12/2005 | Timmins | 600/410 |
| 2007/0073156 A1* | 3/2007 | Zilberman et al. | 600/473 |
| 2009/0318908 A1* | 12/2009 | Van Pieterson et al. | 606/9 |
| 2011/0301095 A1* | 12/2011 | Ronai et al. | 514/19.5 |
| 2013/0065246 A1* | 3/2013 | Magro et al. | 435/7.4 |

OTHER PUBLICATIONS

Pellacani G, et al., "The Impact of In Vivo Reflectance Confocal Microscopy for the Diagnostic Accuracy of Melanoma and Equivacal Melanocytic Lesions," Journal of Investigative Dermatology, 2007, vol. 127, pp. 2759-2765.

* cited by examiner

AUTOMATED DETECTION OF MELANOMA

CROSS REFERENCE TO RELATED APPLICATIONS

The present application claims priority to U.S. Provisional Patent Application No. 61/240,703, filed Sep. 9, 2009, entitled "Automated Detection of Melanoma," the entire disclosure of which is hereby incorporated by reference in its entirety.

GOVERNMENT INTERESTS

This invention was made with Government support under Grant/Contract No. 5T32CA106195-05 awarded by the National Institutes of Health. The Government has certain rights in the invention.

TECHNICAL FIELD

Embodiments herein relate to the field of imaging, and, more specifically, to automated detection of melanoma using certain imaging devices and methods.

BACKGROUND

Melanoma is the most fatal form of skin cancer and the most common lethal skin cancer, with an estimated mortality rate of 14%. The incidence of melanoma in the United States is 60,000 new cases each year, increasing 2% per year.

Melanomas are thought to originate (in situ melanoma) in the epidermis near the dermal-epidermal junction (DEJ), causing disarray/breakdown, and progress in lateral and then vertical (invasive melanoma) growth phases leading to metastasis and death. The current methods of treating melanoma (standard surgical excisions, chemotherapy, radiation therapy, and immunotherapy) offer various degrees of success.
The National Cancer Institute estimates the overall five-year survival rate for melanoma to be 90.5%, with percentages ranging from 97.6% (localized stage I-II) to 16.2% (stage IV). Because of the tendency for melanoma to metastasize, detection of in situ melanoma is critical for efficient excision.

Electrical-Optical Sciences has developed a non-invasive and objective computer vision system intended to aid in the early detection of melanoma called MelaFind®. MelaFind® acquires and displays multi-spectral (from blue to near infrared) digital images of pigmented skin lesions and uses automatic image analysis and statistical pattern recognition to help identify lesions to be considered for biopsy to rule out melanoma. MelaFind® acquires 7 images in the visible spectral bands and 3 images in the near-infrared spectral bands. All images are analyzed for the following: (1) calibration to determine the fraction of the incident radiation that is reflected for every pixel in the image; (2) image quality control that determines whether the images are suitable for further analysis (e.g., a lesion covered with too much hair is automatically rejected and the operator is asked to clip the hair and retake the image); (3) segmentation to create a lesion mask; (4) computation of lesion properties in different spectral bands; and (5) lesion classification. The overall lesion classifier consists of 6 constrained linear classifiers, each trained to differentiate melanomas with 100% sensitivity from a particular type of lesion (low-grade dysplastic nevus, congenital nevus, common nevus, seborrheic keratosis, solar lentigo, and pigmented basal cell carcinoma). Thus, each lesion is characterized by 6 scores. A lesion is recommended for biopsy to rule out melanoma only if all scores are above the threshold value. But, because MelaFind® uses diffuse light, it can only image macroscopic structural details.

Clinical polarized dermoscopy slightly improves spatial resolution to about 100 micrometers by optically separating superficial and deeply penetrating light. This scale is sufficient for gross morphology such as pigmented networks but insufficient to detect important cellular features such as the presence of pagetoid melanocytes (PMs) and subcellular features such as branching dendritic arbores associated with melanoma.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

DETAILED DESCRIPTION OF DISCLOSED EMBODIMENTS

Figure 1:
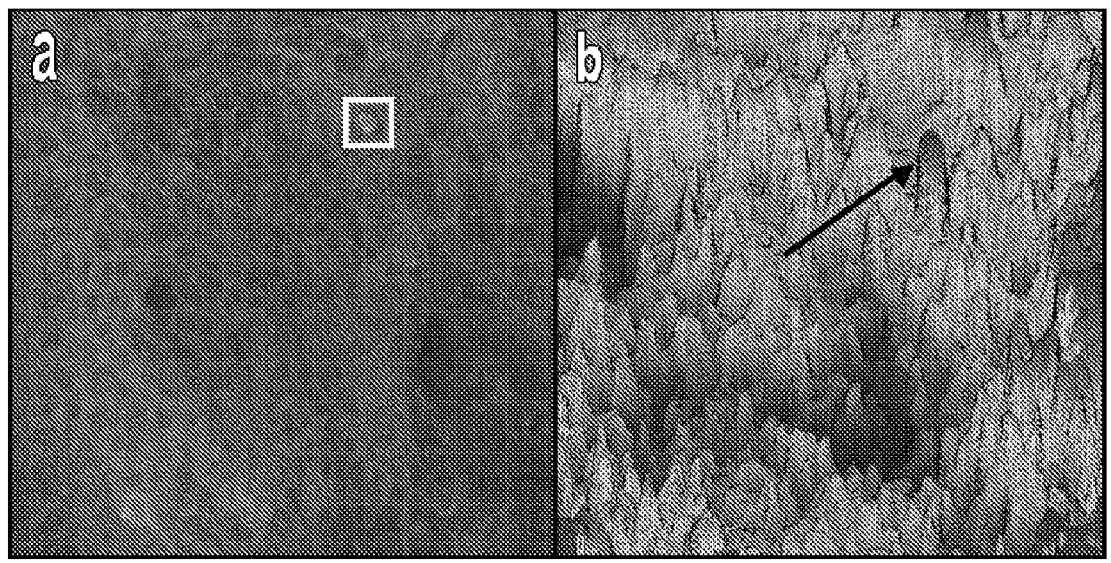
FIG. 1 illustrates (a) a raw confocal image at a particular depth where a PM is clearly visible, as identified by the automatic PM finder with a square; and (b) a 3D surface plot of the first reflective surface with the PM (arrow). Relative to the skin surface, the depth of the PM is 40 μm, while the average depth of the surrounding dermal-epidermal junction (DEJ) is 90 μm.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

In various embodiments, methods, apparatuses, and systems for detecting melanoma, in particular malignant melanoma or superficial spreading melanoma, are provided. In example embodiments, a computing device may be endowed with one or more components of the disclosed apparatuses and/or systems and may be employed to perform one or more methods as disclosed herein.

Virtually all in situ melanoma has irregularity in the pigmented network of the epidermis and the diagnostically relevant basal and granular layers are superficial regions noninvasively accessible with reflectance confocal microscopy (RCM). At this shallow depth, where melanomas arise in nevi, whose pigment provides contrast to observe normal/abnormal morphology, there is interest to classify the superficial pigmented cell networks as nevoid or melanoma. Shadowing is not a significant concern because it is extremely rare for primary melanoma to arise in the dermis without involving the basal or granular layers of the epidermis.

Diagnostic traits of malignancy include presence of pagetoid melanocytes in the epidermis and the breakdown of the DEJ. For automated detection of malignant melanoma or superficial spreading melanoma, referred to broadly herein as melanoma, these features may be analyzed quantitatively using an imaging device and method.

For the purposes of describing embodiments herein, the terms "dermal-epidermal junction" or "DEJ" may be used synonymously. Various portions of the description and the claims indicate that the location of the DEJ is identified. In actuality, the location of the basal layer is used as a proxy for the DEJ as the basal layer is the superficial layer adjacent to the DEJ. Thus, the location of the DEJ is approximated by the location of the basal layer of cells which rests on the DEJ. Herein, the location of the DEJ is referenced, but it should be understood that the methods provide an approximation of that location, which is sufficient for the purposes described herein.

Embodiments herein provide a technique to quantify traits of indolent melanoma in situ (stage I-II) prior to invasion/metastasis based on two criteria: 1) the presence of one or more melanoma cells in the epidermis called pagetoid melanocytes (PMs), and 2) DEJ disarray/breakdown (high-spatial-frequency fluctuations in the DEJ). These diagnostics involve tissue no deeper than the basal layer, which is within the penetration limit of confocal microscopy using 830 nm laser light.

Embodiments herein exploit the optical sectioning capability of RCM to non-invasively survey the DEJ, noting the irregularities associated with malignancy. RCM is an imaging modality suited well for imaging both benign and malignant epidermal melanocytic morphology in vivo. RCM using 830 nm laser light enables noninvasive optical sectioning with axial resolution of approximately 1-2 µm and lateral resolution of approximately 0.5 µm. RCM complements imaging modalities such as magnetic resonance imaging, optical coherence tomography, and high-frequency ultrasound, with the particular strength of high resolution. High NA optical coherence tomography (OCT) is similar to RCM, but with lower noise due to its use of a coherence gate to further reject multiply scattered light, although both OCT and RCM suffer from aberrations (a limiting factor for imaging at depth). Currently available OCT sources allow approximately 1-2 µm axial resolution, therefore one or more methods described herein could be implemented using OCT, such as high resolution focus-tracked OCT. In embodiments, imaging techniques with other contrast modes may be used.

With respect to RCM, a confocal microscope produces "stacks" of images where the superficial image captures the stratum corneum, and successive images (deeper in the skin) penetrate well into the papillary and superficial reticular dermis enabling non-invasive diagnostic analysis of the basal layer. Comprehensive diagnosis and subsequent treatment of melanoma have in the past required both reliable histopathology (sometimes with immunohistochemical stains such as melan-A) and the trained eye of a clinician for assessment. With confocal microscopy and optical (as opposed to physical) sectioning, much of the training for qualified analysis is dedicated to the ability to review large stacks of images. Thus, an embodiment herein provides a method to aid the clinician in diagnosing melanoma through pattern recognition to extract pertinent diagnostic information from large 3D confocal images.

Due to the backscattering nature of melanin granules that have a diameter of 43 nm and a high refractive index of n=1.72 in epidermis that has a low refractive index of n=1.34, melanin provides good contrast for confocal imaging. Heavily melanotic lesions thus appear with bright contrast. The limitations of imaging skin via confocal microscopy in vivo include the non-uniform density of the medium, the lack of penetration permitted by the 830 nm illumination wavelength, and patient movement. However, with near-infrared illumination, a penetration depth of 250-350 µm or more may be achieved, which is sufficient for penetration and imaging of the superficial reticular dermis.

Pagetoid melanocytes or "pagetoid spread," pertaining to the lateral growth phase, are detectable in both conventional histopathology and confocal imaging. Melanoma shows the presence of PMs above the basal layer, which sometimes form irregularly sized nests. The presence of roundish pagetoid cells in the epidermis between the stratum corneum and the basal layer up to approximately 100 µm deep can be identified with a sensitivity of 77.9% and a specificity of 81.4%. This lateral growth phase usually precedes the vertical growth phase when the melanoma invades the basement membrane, causing deadly metastasis, so it is an appropriate target for early detection. Since PMs in suspicious lesions typically reside above the basal layer that is 60 to 90 µm beneath the stratum corneum, they are easily reached by the near-infrared wavelength and imaged.

Another histological hallmark of melanoma is the breakdown of the DEJ. The breakdown of the DEJ, termed "non-edged papillae" due to the appearance of undulations of a broken DEJ sectioned by a confocal microscope, has a sensitivity of 89.7% and a specificity of 58.6%. Thus, in embodiments, identifying the combination of PMs and DEJ breakdown increases the accuracy of detection. In accordance with an embodiment herein, certain metrics may aid the clinician in identifying melanoma with high-resolution image analysis software such as 1) the number of PMs present, and 2) the roughness of the superficial pigmented basal layer near the DEJ.

Current techniques for noninvasive computer-automated melanoma detection, based on macroscopic imaging (i.e., non-cellular detail) such as polarized dermoscopy in combination with the Melafind® algorithm, have thus far achieved only modest specificity with adequate sensitivity. Though automated computer algorithms have shown good concordance with human classification, in low resolution dermoscopy, automated analysis with confocal images of microscopic structures shows greater promise.

In an embodiment, a method may be used to process a 3D confocal volume of images taken by a clinician of a suspicious lesion and deduce the depth location z of the first reflective surface (FRS) at each x-y position. This FRS is where the most superficial high-concentration of melanin resides. In this manner, the stratum corneum and epidermis are digitally stripped and no longer distract the clinician from the more diagnostically relevant pigmented cell network. The FRS is putatively either the depth of the basal layer, indicating the DEJ or the depth of a PM above the DEJ. Thus by creating a 3D surface plot of the FRS for each lateral x,y point, the presence of pagetoid cells is identified by a discreet jump in the FRS above the level of the DEJ. The FRS map may also be used to determine if breakdown of the DEJ is occurring.

Thus, an embodiment herein provides a method comprising receiving by a computing device a plurality of images of a tissue having a dermal-epidermal junction and an epidermal layer, determining by the computing device a depth location of a first reflective surface for each x-y position of the tissue by analysis of the images, determining by the computing device an approximate depth location of the dermal-epidermal junction by analysis of the images, and identifying by the computing device any x-y positions of the tissue at which the first reflective surface is above the approximated depth location of the dermal-epidermal junction. A non-transitory computer-readable storage medium having instructions stored thereon, that, in response to execution by a computing device, cause the computing device to perform methods as described herein may also be provided. Such non-transitory computer-readable storage mediums include, but are not limited to, hard disks, floppy disks, compact disks, digital disks, optical disks, etc.

Embodiments herein also analyze the DEJ surface plot in two dimensions (i.e., an overhead x-y view), and create a threshold method to systematically identify and highlight PMs. The FRS method and the threshold method directly process the raw confocal volume into a 2D image that highlights suspected cellular structures such as PMs and that may be analyzed for its roughness characteristic.

A method presented herein isolates the depth location of the most superficial pigmented surface FRS(x,y), which is the most strongly reflective voxel (along z) at each x-y location. The diagnostically important DEJ can be approximately marked, located, and visualized by FRS due to a step function in melanin concentration from the epidermis to basal layer in all skin types. FRS can be reliably located because penetration to and beneath FRS are not issues: the epidermis does not strongly attenuate and deeply invading melanoma (i.e., prognostic information) always displays the superficial atypia. In isolating FRS, the stratum corneum, non-pigmented epidermis and deeper dermis are digitally removed to reveal the diagnostically-important pigmented cell network either above (in the case of PMs), or in the basal layer. PMs appear as discreet, cell-sized elevations >1 cell-width above the basal layer in FRS. The roughness of FRS, which is a diagnostic measure that correlates with the overall breakdown of the DEJ, is not very sensitive to PMs since PMs occupy only a small lateral fraction of FRS.

To develop and test the methodologies described herein, confocal stacks were acquired on example patients as part of routine clinical testing. Patients consented to the noninvasive imaging prior to biopsy and surgical excision. Confocal imaging was performed on suspicious lesions and only melanomas verified by histology were used. The normal group used for this study was not validated by histopathology but consisted of clinically benign moles according to their low level of asymmetry, low border roughness, uniform color distribution, and small diameter.

For each site, a single axial stack was acquired with the VivaScope 1500™ (Lucid Inc., Rochester N.Y., operating at 830 nm wavelength). After each image capture, the en-face optical section (500 µm field-of-view) was translated 1 µm deeper along the optical axis into the tissue from above the surface of the skin to beneath the maximum depth of optical penetration where the images were dark. The 1 µm axial step size was chosen because the axial resolution at the 830 nm wavelength is about 2 µm, therefore 1 µm steps satisfied the Nyquist sampling criteria: two samples per resolution element. The step and capture routine was repeated 200 times over 1 minute, collecting 200 8-bit bitmap images (1024× 1024 pixels, 300 MB total memory space). To avoid saturation and account for optical attenuation deep in the stack, the laser power was continuously and automatically adjusted for each optical section to match the 256 gray-level range of the pixels to the dynamic range of the imaging system.

The lesions chosen for this example were either unequivocal benign nevi (with no pagetoid cells in the epidermis) or malignant melanomas with the presence of pagetoid spread. The analysis was undertaken to prove the principal of automated detection of PMs and DEJ roughness, two malignant characteristics that may be analyzed separately or may be combined to form a more accurate diagnostic.

In accordance with an embodiment, the disclosed image processing method was created using MATLAB 7.8 (Math Works, Natick, Mass.) and consisted of several subroutines to complete the required tasks. Raw confocal data was rearranged from a folder of 2D images acquired by the step-and-capture routine of the clinical device into a contiguous volume-cube matrix. Due to natural patient movement during imaging, the z-slices of confocal data were generally not aligned and had an x-y-shift between each pair of optical sections. As such, an iterative co-registration method was also developed to eliminate distortions caused by movement. This first subroutine shifted two successive images laterally until the mean pixel error was minimized. The mean pixel error was the net pixel difference, summed over the entire area of overlap, normalized by the number of overlying pixels. In particular, a multidimensional unconstrained nonlinear minimization (Nelder-Mead) minimized the difference between axially adjacent optical sections to determine proper co-registration lateral offset values, eliminating motion artifact. The severity of the correction depended on the microscope stability during clinical acquisition, but in general, the total lateral displacement was not more than 20 percent of the 500 µm field of view. The process was repeated for all successive image pairs in the stack and a new 1000×1000×200 cube matrix was created and saved (using the .mat file format of MATLAB). Of the ten subjects involved in this example, 9 were successfully re-aligned and one was discarded due to severe artifact introduced by patient movement. An eleventh sample was included to complete the data set.

A second subroutine shifted each column in the cube vertically so that horizontal slices through the image matrix represented a flat x-y plane at constant z within the tissue, rather than the curved focal plane imaged by the confocal microscope. In particular, 3D images were adjusted for the field curvature of the RCM (about 10 µm in 500 µm FOV). At each x,y position the depth-resolved reflected signal, R(z), was analyzed to find the superficial peak at the water-coupled interface between stratum corneum and the imaging window, at $z=z0$. An adjusted 3D image was generated which was co-registered relative to the surface: $R(z')=R(z-z0)$. Hence, this last pre-processing subroutine shifted each column of voxels in the image axially such that optical sections in the adjusted 3D image represented a flat x-y plane in the tissue. At each depth z', the values of R(x,y) were normalized by the mean value $<R(x,y)>$, to equalize the image: $R(x,y,z')=R(x,y,z')/<R(x,y,z')>$, causing areas with high reflectivity to stand out.

A third subroutine created a topographical map of the DEJ. First, the depths of the maximum reflectance values were found and assumed to be the location of the stratum corneum. The stratum corneum does not show the greatest absolute reflectivity because the refractive index difference between keratin (n~1.4) and water (n=1.33) is much smaller than melanin (n=1.72) and epidermis (n=1.34). The stratum corneum does however show the highest reflectance, which is the highest amount of reflected light incident on the photodetector in the microscope. When imaging at the surface, the reflected signal does not attenuate through tissue to and from a subsurface focus.

In accordance with an embodiment, the topographical map FRS [µm] was isolated which specified the position of the most reflective voxel along z' at each x,y position. FRS located the superficial pigmented basal cells (or melanocytes) resting on the DEJ and the occasional PM. The "roughness" of FRS was computed as the mean spatial gradient of FRS.

To convert the data from lab units of measured reflectance (volts measured on the microscope photodetector) to true reflectivity at the focus, the data was multiplied by a calibration constant $C=R_{gw}/V_{gw}$ where $R_{gw}$ was the theoretically computed reflectance at the glass/water interface where the glass window contacted the immersion medium (water) that coupled to the skin, $R_{gw}=[(n_g-n_w)/(n_g-n_w)]^2$, and $V_{gw}$ was the voltage measured when focused on the glass/water interface. In practice, glass (n=1.52) or polycarbonate (n=1.58) may be used with crodomol oil (n=1.46) or water (n=1.33), yielding $R_{gw}=0.00444$, $R_{gc}=0.00405$, $R_{pw}=0.00738$ or $R_{pc}=0.00156$. Though not critical for feature analysis, true reflectivity units illustrate endogenous tissue reflectance for comparison among studies. Sometimes, the window was polycarbonate rather than glass and the immersion medium was crodamol rather than water, and in such cases the appropriate refractive index (n) was used. Data sets that had saturated values for the glass/water interface were not normalized. Instead, each reflectance value ($R_i$) was then divided by the average reflectance value ($R_a$) of the slice. This normalizes the confocal stack for the exponential decay of the laser intensity, which causes areas with high reflectivity to stand out.

The depths of the maximum reflectivity values (FRS) were found and assumed to be the location of a PM or the DEJ. To quantify characteristics of the FRS, the difference between the depth of the stratum corneum and the depth of the maximum reflectivity was used to create a topographical map. The threshold method identified PMs by their depth deviating from the surrounding DEJ depth, and a final method looked at the DEJ to see if breakdown had occurred.

A generalized method of identifying melanoma may include automatic identification of pagetoid cells. Additionally, further parameters may be added to the method, such as (1) determination that the pagetoid cells are more reflective than the surrounding 3D volume of epidermis, and/or (2) determination or identification of other properties of the pagetoid cells, for example that the pagetoid cells are located more superficially than the laterally surrounding FRS.

In a particular example, PMs were identified in the reflectance data on the FRS by shallow depth, large gradients of reflectance and FRS surrounding the cell, and a small circumference to area ratio typical of roundish PMs. Locations on FRS were identified as PMs with the following example thresholds chosen by cross-validation: 1) they were located at a depth between 20 µm and 100 µm beneath the glass window interface, because PMs occur in the superficial epidermis; the ratio of their reflectance (based on contiguous high reflectance segmentation to identify border) to the reflectance 3 µm outside their border and G at the border were both greater than 1.7, because surrounding epidermal keratinocytes are comparatively non-reflective and PMs should present discreet elevations in FRS; their area was at least 144 µm$^2$ which excludes stray melanin flecks; and their perimeter was less than 175 µm, which excludes dendritic type cells, selecting only roundish PMs.

Disruption of the FRS exhibited a high roughness factor (calculated as the mean axial gradient of the FRS) for melanoma (y=11.7±3.7, n=5), (mean+/−SD) whereas the FRS displayed a low roughness factor for nevi (5.5±1.0, n=5). The two populations were entirely separable. A 1-tailed T-test for two sample sets of unequal variance yielded p=0.0035.

The combination of the surface plot of the FRS and the threshold method detected the depth of the highest reflectance and highlighted potential PMs. FIG. 1a shows a cross section of raw confocal data from a malignant sample. A PM is highlighted by the rectangle. FIG. 1b shows a topographical map of the DEJ with an arrow pointing at the same PM.

The example threshold method identified characteristics specific to PMs. These characteristics included a shallow depth below the stratum corneum, high reflectance, a low gradient within the cell, a large gradient surrounding the cell, a size typical of melanocytes, and a small circumference to area ratio.

Figure 2:
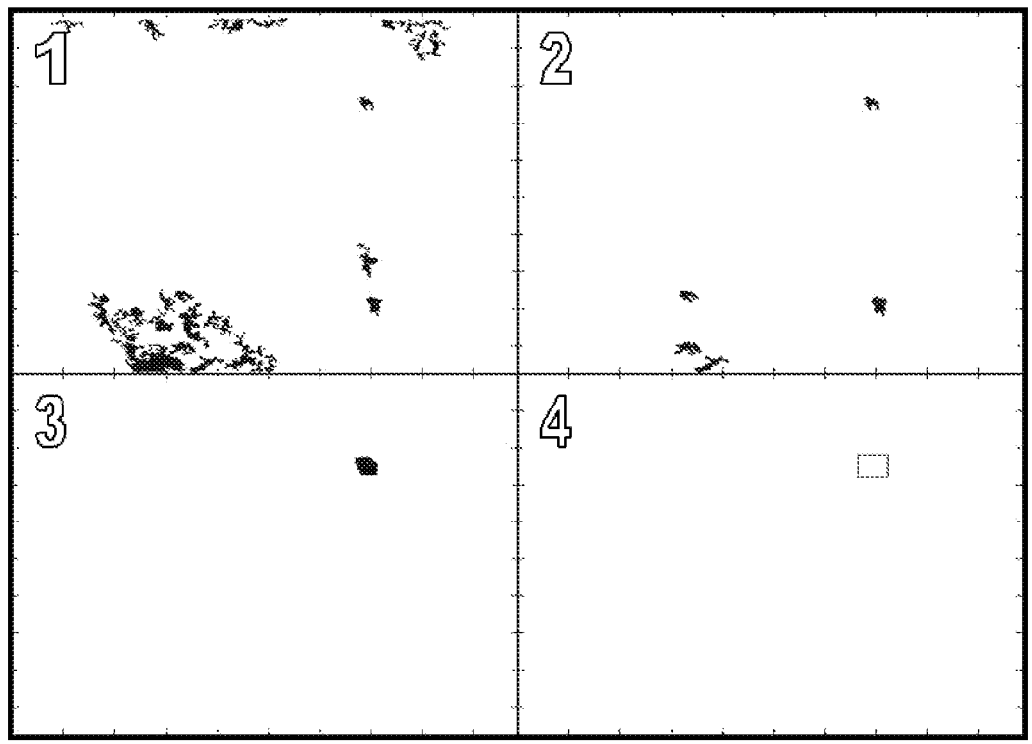
FIG. 2 illustrates progression of a threshold method to identify PMs: (1) step 1 finds the x-y positions of the first reflective surface (FRS) where the depth differs from the surrounding DEJ depth, to yield highlighted areas; (2) step 2 checks the perimeter, circularity, gradient and depth of highlighted objects; (3) step 3 checks the ratio of reflectivities of the highlighted area to the surrounding tissue and/or DEJ, identifying high ratios (such as >2 to 1 or >3 to 1) at locations of PMs; and (4) step 4 outlines the position of the putative PM.

In an example embodiment, a threshold method was divided into three selection stages. The first stage selected areas based on the reflectivity and reflectance values at the depths specified by the DEJ map. Areas where the reflectivity values lay outside of the specified values were eliminated as potential PM locations. In addition, any highlighted areas below a specified size or below a specified depth were thrown out. The second stage looked at the characteristics of the remaining highlighted areas. These characteristics included the length of the perimeter (L), the circularity described as the ratio $L^2$/Area that was constant if the highlighted area was circular, the lateral gradient ($d^2R/(dxdy)$) within the highlighted area, the depth (z), and the ratio of the square of the circumference to the area (A), $c^2/A$, which was constant if the highlighted area was circular. Highlighted areas falling outside the range of the specified values for the characteristics named were eliminated as potential sites for PMs. The third stage took the ratio of the reflectance values within the highlighted area and the reflectance values surrounding the highlighted area. Areas where the reflectance values within the highlighted area were not substantially higher than the values surrounding the area were eliminated as potential PM locations. Finally, the location of each identified PM specified a rectangle that was overlaid on the DEJ map image to facilitate easy location of the PMs. This process is summarized below in Table 1. FIG. 2 shows the progression of the threshold method on the data set illustrated in FIG. 1 as potential pagetoid sites are eliminated after each stage.

TABLE 1

Threshold Method Summary

| Threshold Method | Min/Max | Value |
| --- | --- | --- |
| Stage 1 | | |
| Reflectivity | Min | Mean Reflectivity + 1.7 Stdev |
| Reflectance | Min and Max | MaxReflectance/2 to MaxReflectance/6 |
| Depth | Max | MaxDepth/2 |
| Size | Min | 550 Pixels |
| Stage 2 | | |
| Perimeter (L) | Max | 352 |
| Circularity = $L^2$/Area | Max | 119 |
| Gradient | Max | 5.3467 |
| Depth | Min | MaxDepth/10.15 |
| Stage 3 | | |
| InReflectivity/ OutReflectivity | Min | 1.7205 |
| InReflectance/ OutReflectance | Min | 1.2052 |
| (InReflectivity/ OutReflectivity) × (InReflectance/ OutReflectance) | Min | 2.4676 |

Applying the threshold method identified PMs in all the melanomas but not in any of the nevi. Thus, in an embodiment, there is provided a method comprising identifying x-y positions of a first reflective surface of a tissue where the depth of the first reflective surface differs from an approximated surrounding dermal-epidermal junction depth to yield one or more identified areas, and determining a ratio of reflectivities of each identified area to the surrounding tissue and/or the approximated dermal-epidermal junction to identify locations of pagetoid melanocytes.

Figure 3:
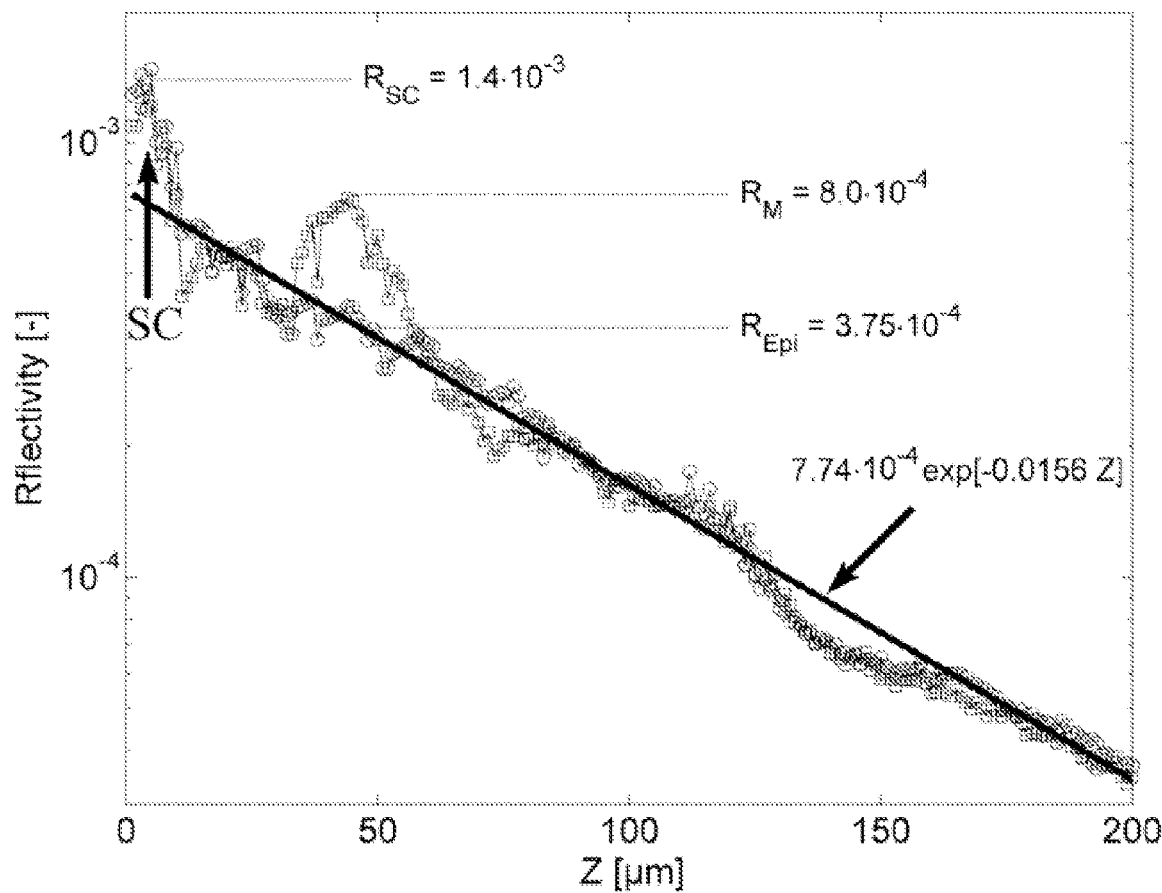
FIG. 3 illustrates an axial true reflectivity profile through one PM (squares), relative to a profile through laterally adjacent surrounding epidermis only (circles). Centered at z=5 μm, the reflectance of the stratum corneum (SC) is $1.4 \times 10^{-3}$. Beneath the SC, the bulk tissue reflectance decay is fit with an exponential. Centered at z=45 μm, a PM's measured peak reflectance is $8.0 \times 10^{-4}$, which is $4.25 \times 10^{-4}$ abovethe epidermal background at z=45 μm ($3.75 \times 10^{-5}$). The decaying exponential least square error fit to the data, which is not sensitive to data points in the SC (z<10 μm), represents the background reflectance of the epidermis.

FIG. 3 shows an example of the true reflectivity versus depth for a trace (axial profile) through a single PM. Compared to the true reflectance of 0.00023 previously reported for a mouse melanocyte at 488 nm, the human PM shown at $z \approx 30\text{-}60$ μm appears 3.5 times more reflective at 830 nm, $R_M = 0.00080$.

Figure 4:
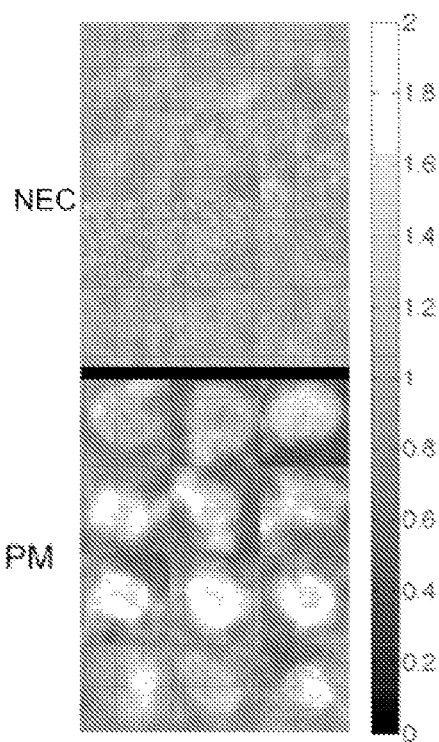
FIG. 4 illustrates in vivo confocal reflectance images of 12 sites of normal epidermal cells (NEC) and 12 PMs. Each image is the summation of voxel counts over the 30 μm depth distance of the image cube, then the image is normalized by the median value of all pixels. This normalization adjusts for site-to-site variations in the strength of reflected signal, for example when a site is more superficial or deeper in the skin.

For each melanoma, a set of 2 to 3 tissue sites (60×60×60 voxels=30×30×60 μm) were identified that either contained a clearly visible PM or contained only normal epidermal cells (NEC). FIG. 4 shows examples of PMs and NECs.

A histogram of the true reflectivity of the 108,000 voxels in each cell cube was generated. A clear normal distribution of low reflectivity voxels was apparent (associated with background epidermal reflectivity) and was fit with a Gaussian distribution (mean±SD=15±5 (n≈90,000 voxels) [counts] for both PM and NEC sites (a histogram, $N_{LOW}$ versus $COUNTS_{LOW}$). Then this background was subtracted from the histograms, yielding a difference distribution of ~20,000 voxels with higher reflectivity (a histogram, $N_{HIGH}$ versus $COUNTS_{HIGH}$). The integration of the product $N_{LOW}COUNTS_{LOW}$ and the product $N_{HIGH}COUNTS_{HIGH}$ yielded the total reflected counts from low reflectivity voxels ($C_{LOW}$) and high-reflectivity voxels ($C_{HIGH}$), respectively. The ratio $C_{HIGH}/C_{LOW}$ was used to characterize the site for the presence or absence of a PM, and also served to cancel any site-to-site variation in strength of reflectance.

Figure 5:
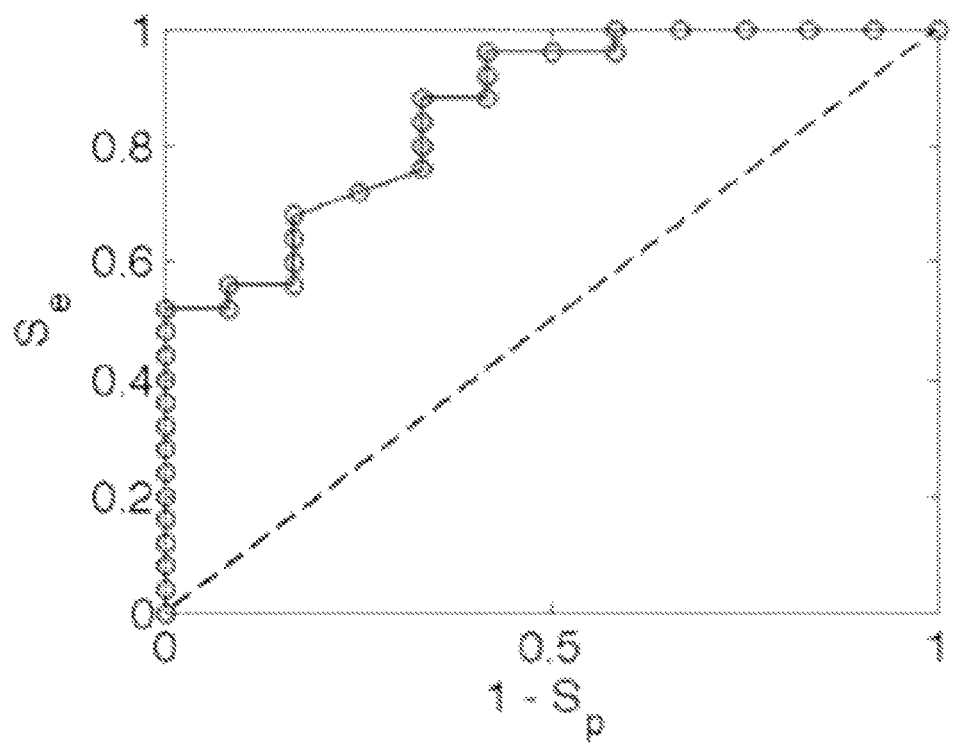
FIG. 5 illustrates sensitivity ($S_e$) and specificity ($S_p$) of discriminating PMs versus normal epidermal cells using the ratio $C_{HIGH}/C_{LOW}$ as a discriminator, where $C_{HIGH}$ is the total reflectance from high-reflectivity voxels inside the cell and $C_{LOW}$ is the total reflectance from low-reflectivity voxels outside the cell, within a 60 μm×60 μm×30 μm cube enclosing a suspected PM.

A range of threshold values of $C_{HIGH}/C_{LOW}$ was tested for the ability to properly discriminate 12 PM and 12 NEC, yielding the plot of sensitivity (Se) versus specificity (plotted as 1-Sp) in FIG. 5. FIG. 5 shows that Se equals Sp at a value of 0.74. As the threshold is lowered, Se rises and Sp drops. Se equals 0.96 when Sp equals 0.50.

Figure 6:
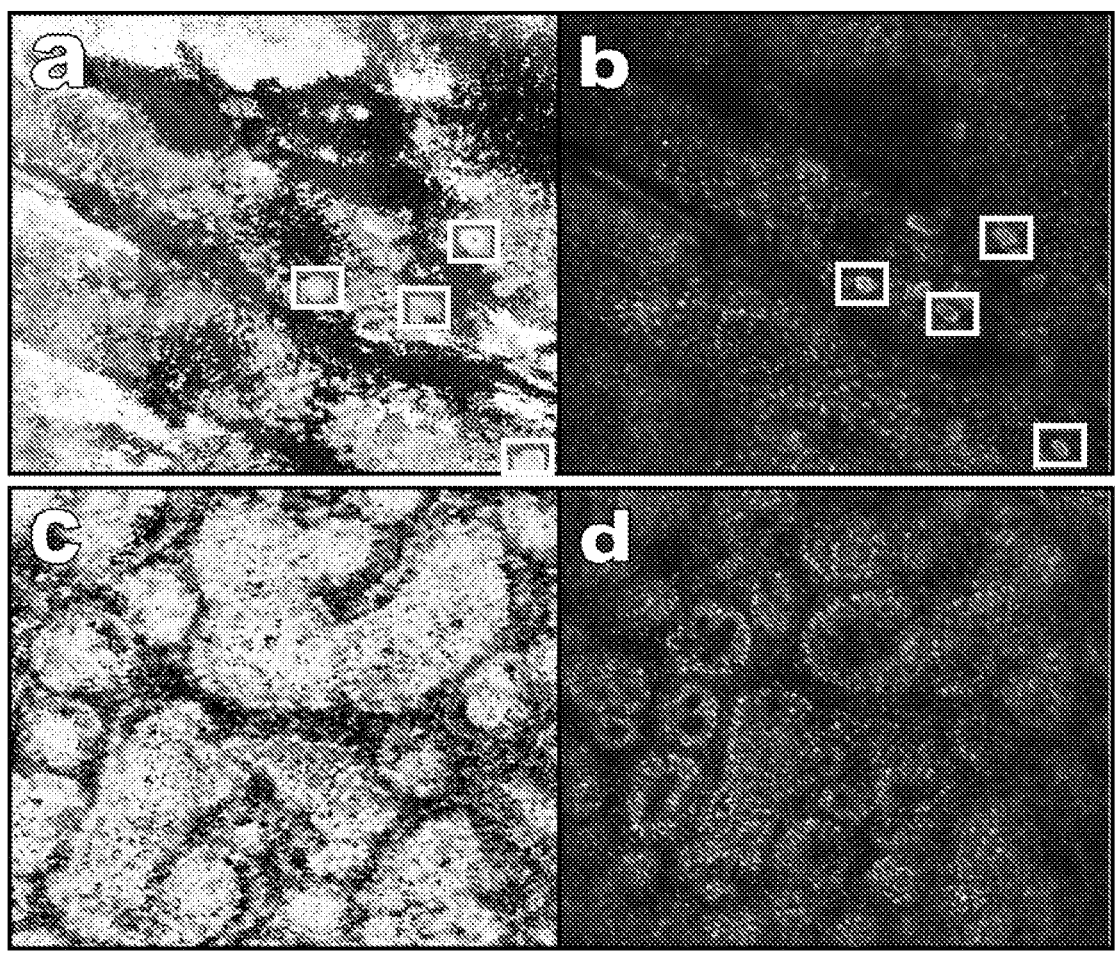
FIG. 6 illustrates (a) a plot of the first reflective surface where bright pixels represent a more superficial first reflective surface; (b) a raw confocal image at a particular depth where the four PMs are clearly visible; and (c, d) benign nevus.

FIG. 6a shows the surface plot of the DEJ with rectangles drawn by the system to highlight PMs. To check the results of the threshold method, the highlighted picture is compared to a cross section of the raw data containing PMs (FIG. 6b). In FIG. 6b the rectangles were drawn manually. FIGS. 6c and 6d show the DEJ and a cross section of a benign sample.

In accordance with an embodiment, the DEJ breakdown method determines the FRS roughness factor by computing the mean spatial gradient of each FRS image. First, the map of the DEJ was filtered by performing median filtering. The median filter excludes tiny melanin flecks that sometimes occur in the epidermis and increase the FRS roughness factor artificially, since they are not true cells. Then the absolute gradient in the x direction ($G_x$=dR/dx) and the absolute gradient in the y direction ($G_y$=dR/dy) were added to create a gradient map (G) of the DEJ. The mean of this gradient map is a roughness factor ($\psi$).

$$G = |G_x| + |G_y| \quad (1)$$

$$\Psi = \frac{1}{n}\sum_{1}^{n} G_i \quad (2)$$

Disruption or a broken nature of the FRS exhibited a higher roughness factor, whereas a smooth DEJ displayed a lower roughness factor. The four malignant samples all had higher roughness factors than the benign samples. The results are shown in Table 2.

TABLE 2

Roughness Factors, $\psi$ = <G> (eq. 1), where G is the gradient (eq. 2) for 5 nevi

| Nevi | Melanoma |
| --- | --- |
| 6.1226 | 9.7760 |
| 5.8304 | 17.6942 |
| 4.4148 | 10.9738 |
| 4.4414 | 7.87260 |
| 6.6186 | 12.0322 |

In accordance with embodiments herein, automatically identifying PMs in noninvasive confocal images provides a useful screening tool in the clinic. The confocal technique bases diagnostic suggestion on the cellular morphology showing potential for rapid diagnostics to serve as an adjunct to present clinical dermoscopy and the clinician's eye. In the above-example, in vivo confocal stacks were captured in about ten minutes and analyzed using the machine vision method in about another five minutes. Because cells lie in a plane within the skin, going through a confocal stack to identify suspicious cells can be tedious. The methods described herein precisely locate suspect cells, and thus simplify the clinician's search.

Beginning with in vivo, noninvasive confocal images from unequivocal melanomas and benign nevi, embodiments herein provide a pattern recognition method that automatically identified PMs in all melanomas and identified none in the benign nevi. The second pattern recognition method analyzed the pigmented network at the DEJ, where melanoma is thought to arise. The roughness of this 3D surface was quantified by calculating the mean axial gradient between laterally adjacent points. The disruption of the DEJ by melanoma leads to a high mean gradient in the melanoma data and a comparatively low mean gradient in the benign nevi. The data showed good statistical significance (p=0.02).

As indicated herein, RCM enables noninvasive cytological analysis to complement dermoscopy and histopathology for melanoma detection with sub-cellular resolution and sufficient penetration to interrogate the DEJ where melanoma originates. Automated isolation of the diagnostically valuable basal layer and identification of irregularity therein may expedite clinical translation of RCM from the bench to the bedside with 3D graphics, facilitating the recognition of at least two features of melanoma, PMs and DEJ disruption. Further, a key discriminator used to detect PMs versus surrounding epidermis is high relative reflectivity due to increased melanin granule content, and possibly increased density of lipid membranes.

Automated detection of melanoma bridges the gap between dermoscopy and typical biopsies. Non-invasive methods of screening nevi may help prevent unnecessary biopsies or enable survey of more nevi than feasibly biopsied with greater diagnostic accuracy than dermoscopy. The automated identification of possible tumors also allows the detection of melanoma in non-sterile environments or remote areas without doctors.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A method, comprising:
    receiving by a computing device a plurality of images of a tissue having a dermal-epidermal junction and an epidermal layer;
    determining by the computing device a depth location of a first reflective surface for each x-y position of the tissue by analysis of the images;
    determining by the computing device an approximate depth location of the dermal-epidermal junction by analysis of the images; and
    identifying by the computing device x-y positions of the tissue at which the first reflective surface is above the approximated depth location of the dermal-epidermal junction to yield one or more identified areas; and
    for each identified area in the one or more identified areas:
        calculating a lateral gradient within the identified area;
        determining ratio of reflectivities of the identified area to reflectivities of tissue surrounding the identified area;
        calculating a circumference to area ratio of the identified area; and
        identifying the identified area as a pagetoid melanocyte in response to the following conditions: the lateral gradient within the identified area less than a gradient threshold, a size of the identified area greater than a size threshold, the circumference to area ratio of the identified area less than a circumference to area ratio threshold, and the ratio of reflectivities of the identified area to reflectivities of tissue surrounding the identified area eater than a reflectivity ratio threshold.

2. The method of claim 1, further comprising analyzing by the computing device the dermal-epidermal junction for evidence of breakdown.

3. The method of claim 2, wherein analyzing the dermal-epidermal junction for evidence of breakdown comprises determining by the computing device a first reflective surface roughness factor by computing a mean spatial gradient for each image showing a first reflective surface.

4. The method of claim 3, wherein computing a mean spatial gradient for each image showing a first reflective surface comprises first applying a median filter to a map of the dermal-epidermal junction.

5. The method of claim 4, wherein computing a mean spatial gradient for each image showing a first reflective surface further comprises adding an absolute gradient in x and y directions to create a gradient map of the dermal-epidermal junction, wherein a mean of the gradient map defines the roughness factor.

6. The method of claim 1, further comprising generating by the computing device a 3D surface plot of the first reflective surfaces for the x-y positions of the tissue.

7. The method of claim 6, wherein the 3D surface plot represents depth of stratum corneum compared to depth of the first reflective surface.

8. The method of claim 1, further comprising processing one or more of the received images to remove artifact or image distortion.

9. The method of claim 8, wherein processing one or more of the received images comprises laterally shifting one or more of the plurality of images to align the plurality of images.

10. The method of claim 8, wherein processing one or more of the received images comprises shifting each column of voxels in the plurality of images axially such that optical sections in shifted images represent a flat x-y plane in the tissue.

11. A non-transitory computer-readable storage medium having instructions stored thereon, that, in response to execution by a computing device, cause the computing device to perform a method comprising:
    receiving by a computing device a plurality of images of a tissue having a dermal-epidermal junction and an epidermal layer;
    determining by the computing device a depth location of a first reflective surface for each x-y position of the tissue by analysis of the images;
    determining by the computing device an approximate depth location of the dermal-epidermal junction by analysis of the images; and identifying by the computing device x-y positions of the tissue at which the first reflective surface is above the approximated depth location of the dermal-epidermal junction to yield one or more identified areas; and for each identified area in the one or more identified areas:
  calculating a lateral gradient within the identified area;
  determining a ratio of reflectivities of the identified area to reflectivities of tissue surrounding the identified area;
  calculating a circumference to area ratio of the identified area; and
  identifying the identified area as a pagetoid melanocyte in response to the following conditions: the lateral gradient within the identified area less than a gradient threshold, a size of the identified area greater than a size threshold, the circumference to area ratio of the identified area less than a circumference to area ratio threshold, and the ratio of reflectivities of the identified area to reflectivities of tissue surrounding the identified area greater than a reflectivity ratio threshold.

12. A method comprising:
identifying, with one or more computing devices, x-y positions of a first reflective surface of a tissue where a depth of the first reflective surface differs from an approximated surrounding dermal-epidermal junction depth to yield one or more identified areas; and for each identified area in the one or more identified areas:
  calculating a lateral gradient within the identified area;
  determining a ratio of reflectivities of the identified area o reflectivities of tissue surrounding the identified area;
  calculating a circumference to area ratio of the identified area; and
  identifying the identified area as a pagetoid melanocvte in response to the following conditions: the lateral gradient within the identified area less than a gradient threshold, a size of the identified area greater than a size threshold, the circumference to area ratio of the identified area less than a circumference to area ratio threshold, and the ratio of reflectivities of the identified area to reflectivities of tissue surrounding the identified area eater than a reflectivity ratio threshold.

13. The method of claim 12, wherein the reflectivity ratio threshold is greater than or approximately equal to 1.7.

14. The method of claim 12, further comprising determining one or more of perimeter, roughness, circularity, gradient and depth of each identified area.

15. The method of claim 1, wherein the gradient threshold is less than or approximately equal to 5.3, the size threshold is greater than or substantially equal to 550 pixels, the reflectivity ratio threshold is greater than or approximately equal to 1.7, and wherein the circumference to area ratio of each identified area is calculated according to $L^2/A$, where L is a perimeter of the identified area and A is the area of the identified area, and wherein the circumference to area ratio threshold is less than or approximately equal to 119.

* * * * *